Figure 1:
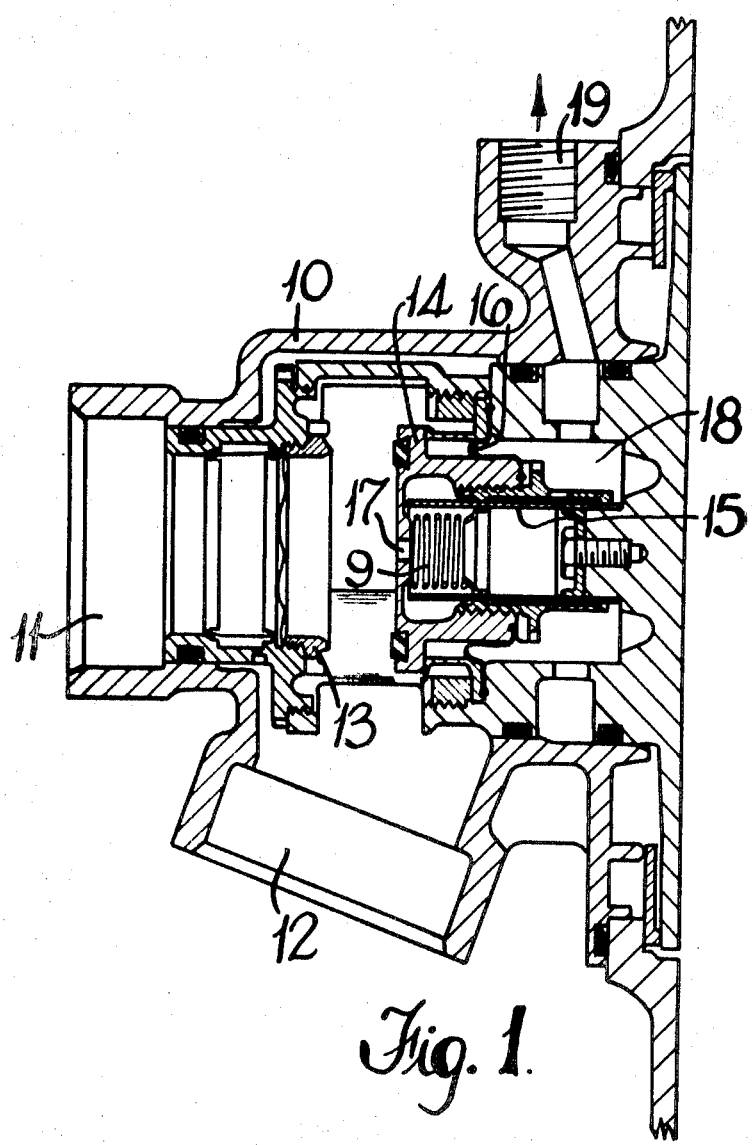

United States Patent

[11] 3,603,342

| [72] | Inventor | Harry Simister Bottoms |
| | | Olton, Solihull, England |
| [21] | Appl. No. | 830,798 |
| [22] | Filed | June 5, 1969 |
| [45] | Patented | Sept. 7, 1971 |
| [73] | Assignee | Joseph Lucas (Industries) Limited |
| | | Birmingham, England |

[54] LEVEL CONTROL ARRANGEMENTS FOR FUEL TANKS
2 Claims, 2 Drawing Figs.

[52] U.S. Cl. ..................................................... 137/414, 251/46
[51] Int. Cl. ..................................................... F16k 31/34
[50] Field of Search ........................................... 137/414; 251/45, 46, 319, 320, 321, 331

[56] References Cited
UNITED STATES PATENTS

| 2,849,019 | 8/1958 | Oliveau et al. | 137/414 X |
| 3,194,258 | 7/1965 | Grant | 251/46 X |
| 3,385,316 | 5/1968 | Couffer, Jr. | 137/414 |
| 3,387,620 | 6/1968 | Walters | 137/414 X |
| 3,402,732 | 9/1968 | Hardison | 137/414 X |

*Primary Examiner*—M. Cary Nelson
*Assistant Examiner*—David R. Matthews
*Attorney*—Holman & Stern ABSTRACT: An arrangement for controlling the level of fluid in a tank has a main valve whose closure member is displaced towards its seat by the combined effect of a fluid pressure and a spring. This fluid pressure is vented by means of a pilot valve to open the main valve. The pilot valve is itself operated by a float in the tank. The closure member of the pilot valve is spring loaded towards the pilot valve seat, and the arrangement is such that pressure tending to shut the main valve also tends to displace the pilot valve closure member from its associated seat. The rate of closure of the main valve is thus reduced, with a consequent reduction in the hydraulic hammer effects experienced in known valves.

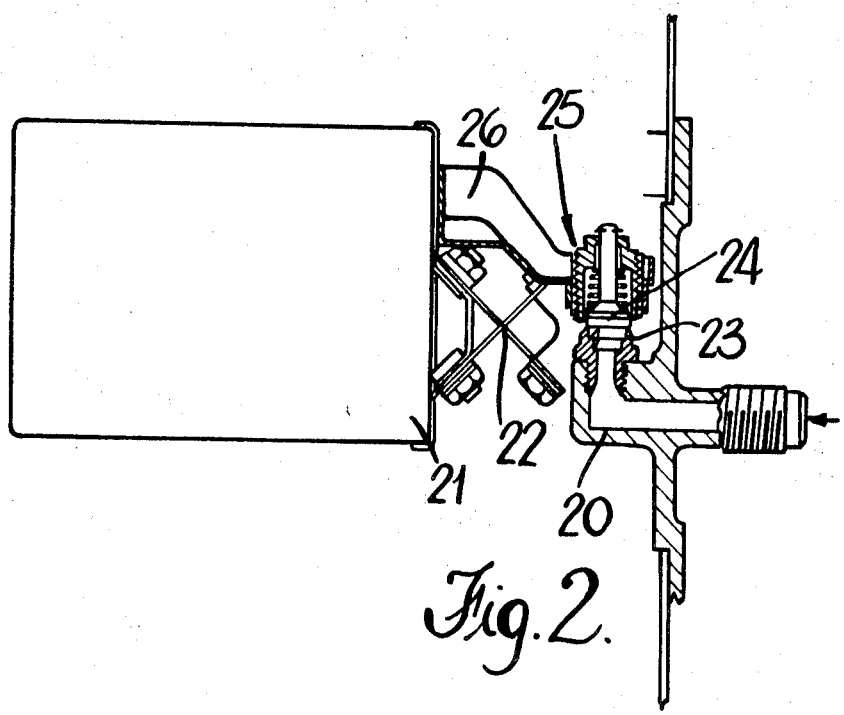

LEVEL CONTROL ARRANGEMENTS FOR FUEL TANKS

This invention relates to level control arrangements for fuel tanks of the kind comprising a float-operated pilot valve and a main valve actuable under the control of said pilot valve to control flow of fuel into a tank.

It has been proposed to employ a master valve in which there is a closure member movable towards and away from a seat, the closure member having an orifice which communicates with the pressure upstream of said seat when the closure member is engaged with the seat, whereby fuel passing through said orifice and escaping via the pilot valve generates a pressure signal acting upon the closure member to urge it towards its seat. It has been found, however, that an arrangement of this sort is liable to give rise to "water hammer" effects if the main valve closure member is allowed completely free movement up to its seat. It is an object of the present invention to provide an arrangement in which water hammer effect is eliminated, or at least reduced substantially.

In accordance with the invention there is provided a level control arrangement of the kind specified comprising a main valve having a closure member movable towards and away from a seat, said closure member having an orifice which communicates with the pressure upstream of said seat when the closure member engages the seat, the fluid flow through said orifice and said pilot valve serving to create a pressure acting upon the closure member to urge it away from its seat, the pilot valve having a seat and a closure assembly movable towards and away from said seat by means of a float, said closure assembly incorporating a closure member for cooperating with the seat, said closure member being yieldably mounted on said closure assembly whereby fluid pressure acting to close the main valve closure member serves to displace the pilot valve closure member away from its seat.

In the accompanying drawings FIG. 1 is a section showing a main valve for use in an example of the invention, FIG. 2 being a section of a coacting pilot valve.

Referring firstly to FIG. 1 the main valve includes a body 10 having an inlet port 11, and outlet port 12 and a seat 13 separating the inlet port 11 from the outlet port 12. A closure member 14 is mounted for sliding movement on a fixed sleeve 15 towards and away from the seat 13. A spring 9 is engaged between the closure member 14 and a projection on the sleeve 15 and serves to bias the closure member 14 towards the seat 13. The closure member 14 is in the form of a cup-shaped piston sealingly coupled to the surrounding wall of the body 10 by means of a rolling diaphragm 16. The closure member 14 is formed with an orifice 17 which, when the closure member is in engagement with the seat 13 communicates with the inlet port 11.

There is a chamber 18 formed in the housing which can receive fluid from the inlet port 11 via the orifice 17. Fuel can leave the chamber 18 via a control port 19 in the body. The arrangement of chamber 18 is such that fuel pressure therein urges the closure member 14 towards its seat.

Turning now to FIG. 2 the pilot valve incorporates a body 20 on which a float 21 is pivotally supported by means of crossed leaf springs 22. The body has an orifice defined by a seat 23 with which a closure member 24 forming part of a closure assembly 25 secured on a projection 26 on the float 21 coacts. The closure assembly 25 slidably supports the closure member 24 which is spring loaded towards the seat 23.

In use, whenever the level in the tank is lower than that required the pilot valve will be fully or partially opened so that there will be a flow of fuel through the orifice 17, the control port 19 and out via the seat 23 into the tank. The pressure in chamber 18 is therefore kept at a sufficiently low value for the fuel pressure in the inlet port 11 to hold the closure member 14 away from its seat. As the tank fills the closure assembly 25 of the pilot valve approaches the seat 23 thereby progressively restricting flow from the seat 23. This causes the pressure in the chamber 18 to rise. For each position of the float there will be a corresponding equilibrium position of the closure member 14.

It will be noted that the rise in pressure in the chamber 18 acts upon the pilot valve closure member 24 tending to urge this away from the seat 23. Thus, as the pilot valve closure assembly 25 approaches the seat 23 the rate at which the closure member 24 itself approaches the seat 23 will be reduced thereby slowing down the final closing movement of the closure member 14 onto its seat 13. Water hammer effects are thereby avoided.

I claim:

1. A level control arrangement comprising a float-operated pilot valve and a main valve actuable under the control of the pilot valve, the main valve having a closure member movable towards and away from a seat, a flexible diaphragm seal between the closure member and the remainder of the main valve whereby unrestricted movement of said closure member is permitted, said closure member having an orifice which communicates with the pressure upstream of said seat when the closure member engages the seat, the fluid flow through said orifice and said pilot valve serving to create a pressure acting upon said closure member to urge it away from its seat, the pilot valve having a port and a closure assembly movable towards and away from said port by means of a float, said closure assembly incorporating a closure member for cooperating with the port, said pilot valve closure member being yieldably mounted on said closure assembly whereby fluid pressure acting to close the main valve closure member serves to displace the pilot valve closure member away from its port.

2. A level-control arrangement comprising a float-operated pilot valve and a main valve having a closure member movable towards and away from a seat, a flexible diaphragm seal between the closure member and the remainder of the main valve whereby unrestricted movement of said closure member is permitted, said closure member having an orifice which communicates with the pressure upstream of said seat when the closure member engages the seat, the fluid flow through said orifice and said pilot valve serving to create a pressure acting upon said closure member to urge it away from its seat, the pilot valve having a port and a closure assembly movable towards and away from said port by means of a float, said closure assembly incorporating a closure member for cooperating with the port, said pilot valve closure member being yieldably mounted on said closure assembly and being spring loaded against the closure assembly and towards its associated port, whereby fluid pressure acting to close the main valve closure member serves to displace the pilot valve closure member away from its port.